United States Patent
Gaffiero et al.

(10) Patent No.: US 9,950,478 B2
(45) Date of Patent: Apr. 24, 2018

(54) METHOD OF FABRICATING A SPAR FOR A BLADE, AND A METHOD OF FABRICATING A BLADE

(71) Applicant: AIRBUS HELICOPTERS, Marignane (FR)

(72) Inventors: Jacques Gaffiero, Paris (FR); Benedicte Rinaldi, Paris (FR); Andre Amari, La Chapelle en Serval (FR)

(73) Assignee: AIRBUS HELICOPTERS, Marignane (FR)

( * ) Notice: Subject to any disclaimer, the term of this patent is extended or adjusted under 35 U.S.C. 154(b) by 298 days.

(21) Appl. No.: 14/800,965

(22) Filed: Jul. 16, 2015

(65) Prior Publication Data
US 2016/0016365 A1 Jan. 21, 2016

(30) Foreign Application Priority Data
Jul. 18, 2014 (FR) .................................... 14 01624

(51) Int. Cl.
*B29C 70/38* (2006.01)
*F01D 5/14* (2006.01)
*B29D 99/00* (2010.01)
*B64C 27/473* (2006.01)
*B33Y 80/00* (2015.01)
(Continued)

(52) U.S. Cl.
CPC .......... *B29C 70/386* (2013.01); *B29C 70/382* (2013.01); *B29D 99/0025* (2013.01); *B33Y 80/00* (2014.12); *B64C 27/473* (2013.01); *F01D 5/147* (2013.01); *B29K 2105/0872* (2013.01); *B29L 2031/082* (2013.01); *B64C 2027/4736* (2013.01)

(58) Field of Classification Search
CPC ..... B29C 70/382; B29C 70/386; B33Y 80/00; B64C 27/473; B64C 2027/4736; B29D 99/0025; F01D 5/147; B29K 2105/0872; B29L 2031/082
See application file for complete search history.

(56) References Cited

U.S. PATENT DOCUMENTS

| | | |
|---|---|---|
| 3,713,753 A | 1/1973 | Brunsch |
| 4,096,012 A | 6/1978 | Belko et al. |
| 8,070,452 B2 | 12/2011 | Parisy et al. |

FOREIGN PATENT DOCUMENTS

| | | |
|---|---|---|
| DE | 2738514 | 3/1978 |
| FR | 993491 | 10/1951 |

(Continued)

OTHER PUBLICATIONS

French Search Report for French Application No. FR 1401624, Completed by the French Patent Office on Apr. 23, 2015, 6 Pages.

*Primary Examiner* — Moshe Wilensky
(74) *Attorney, Agent, or Firm* — Brooks Kushman P.C.

(57) ABSTRACT

A method of fabricating a spar for a blade, which spar includes transversely at least one arrangement. A male former is defined for each arrangement that is to be fabricated and each arrangement is subdivided into a pressure-side subassembly and a suction-side subassembly, each comprising a plurality of hanks, each hank comprising a plurality of U-shaped tape segments stacked on one another. Each subassembly of an arrangement is fabricated outside a mold for fabricating the blade on a single former adapted to that particular arrangement, fabrication being by stacking tape segments on the former using a fiber placement method implemented by a placement head.

18 Claims, 5 Drawing Sheets

(51) Int. Cl.
　　　*B29K 105/08*　　　(2006.01)
　　　*B29L 31/08*　　　(2006.01)

(56) References Cited

FOREIGN PATENT DOCUMENTS

| FR | 2030036 | 10/1970 |
|----|---------|---------|
| FR | 2321997 | 3/1977 |
| FR | 2918347 | 1/2009 |
| FR | 2993491 | 1/2014 |
| GB | 2092543 | 8/1982 |
| JP | 63179706 | 7/1988 |
| WO | 9922932 | 5/1999 |

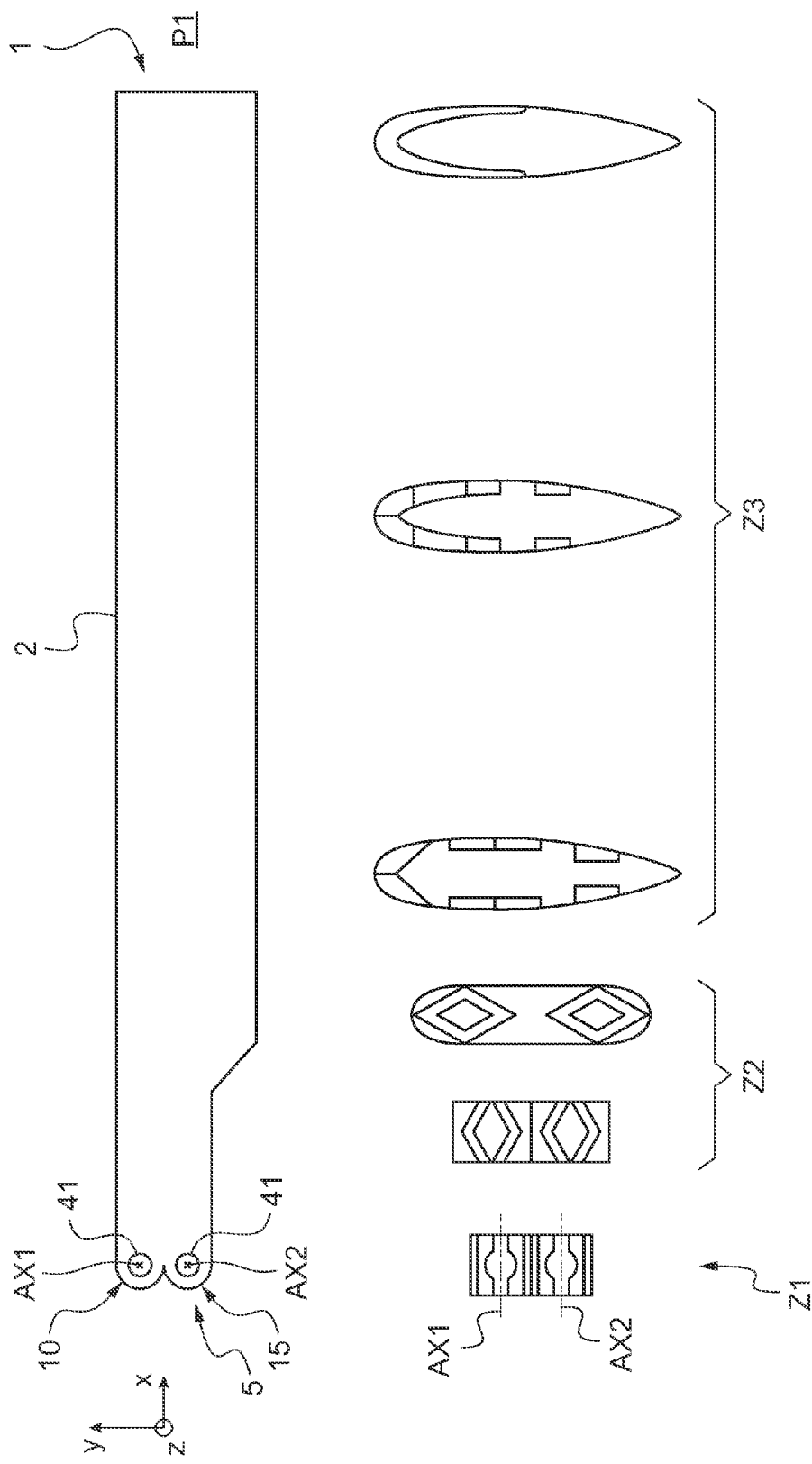

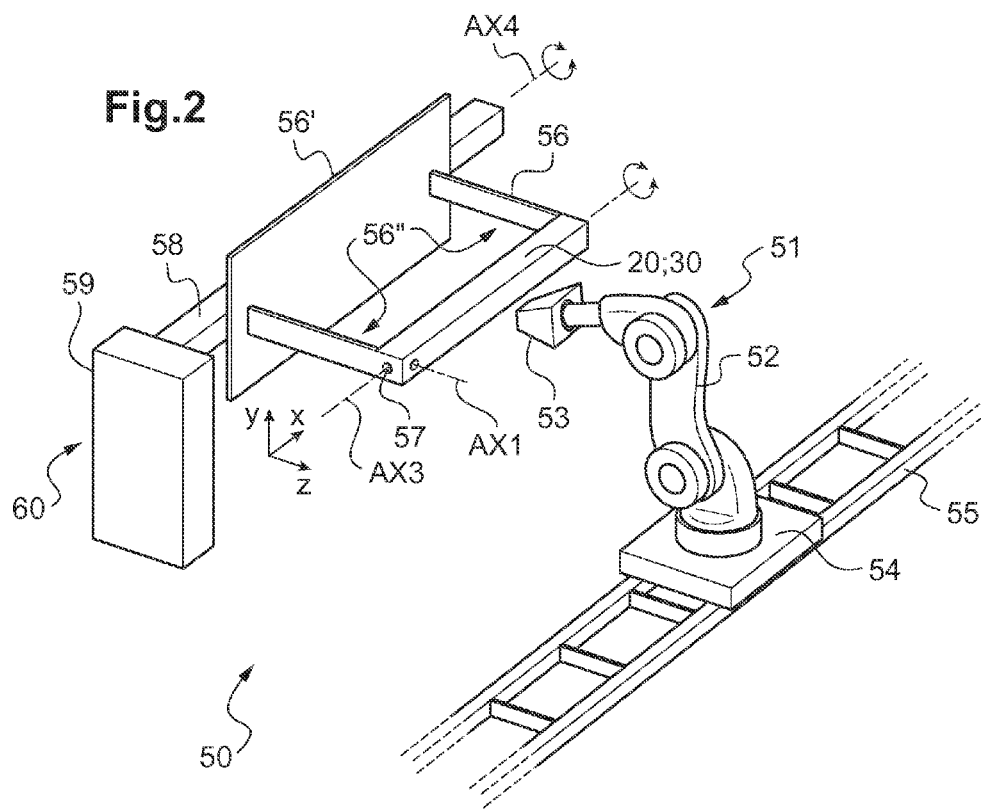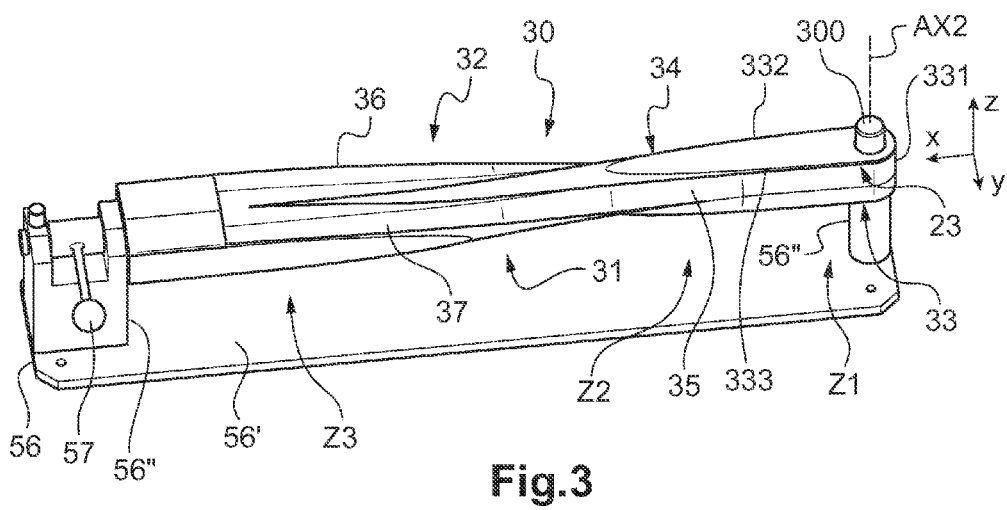

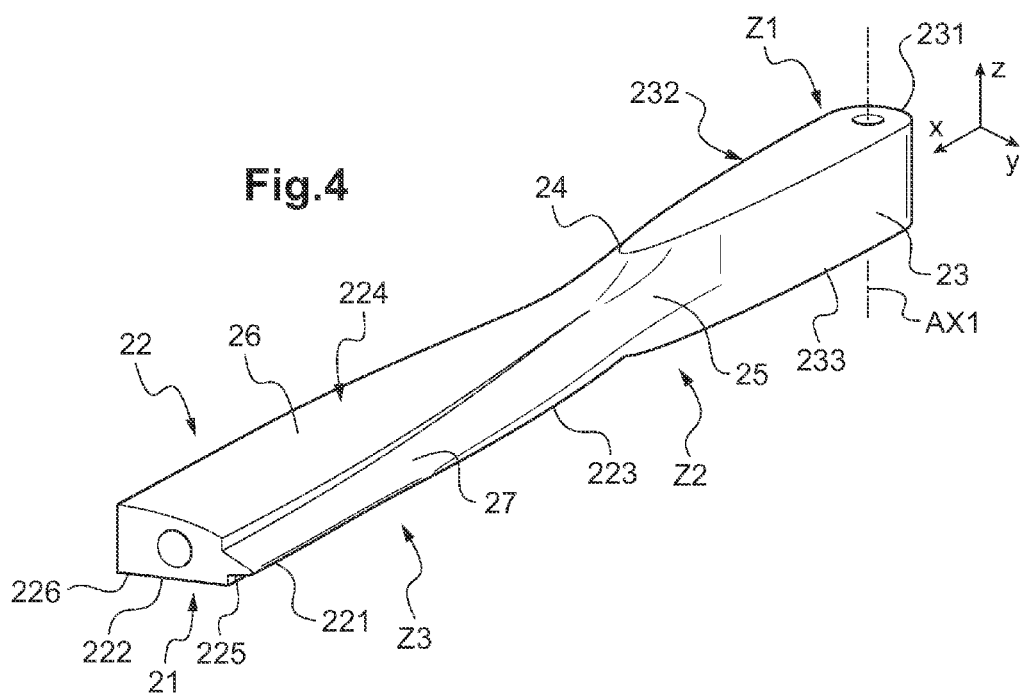
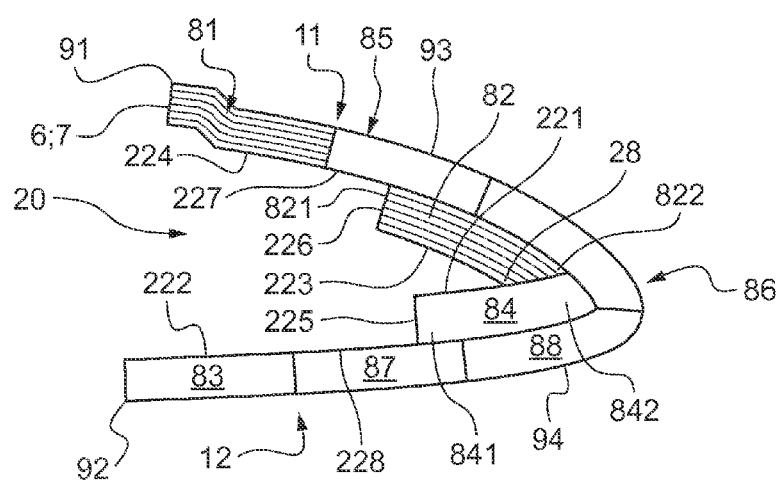

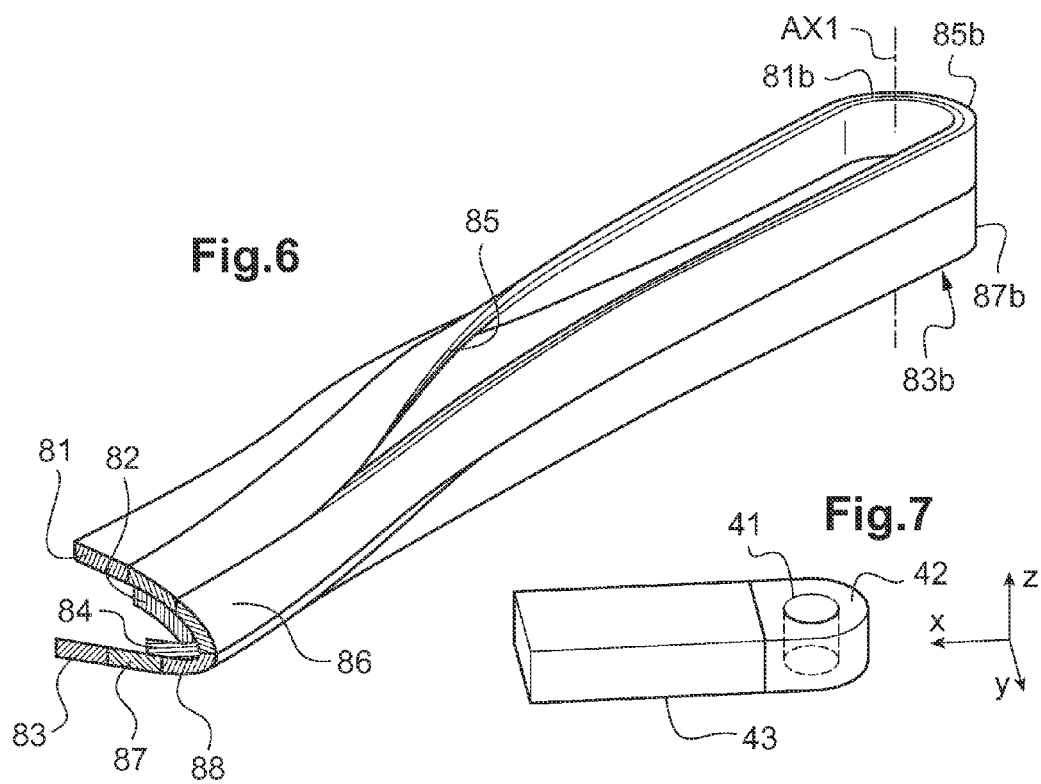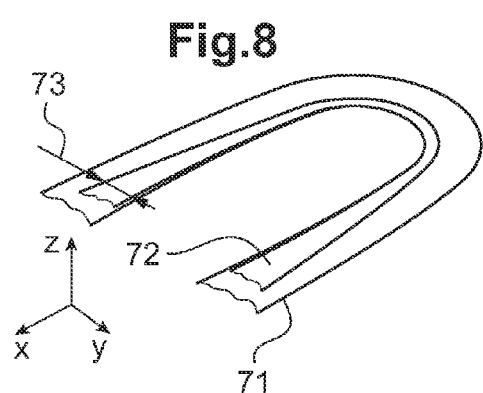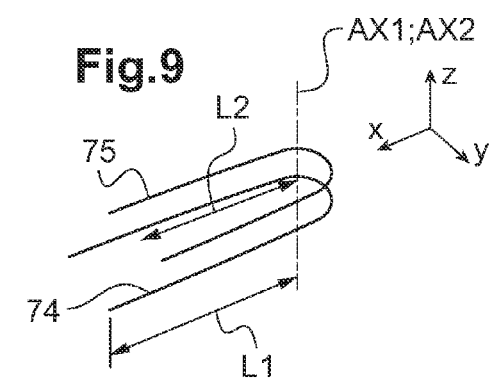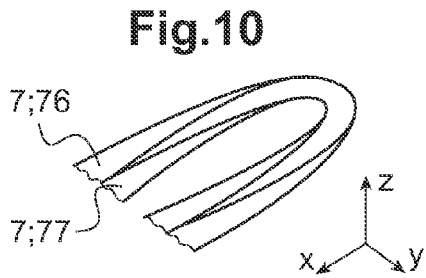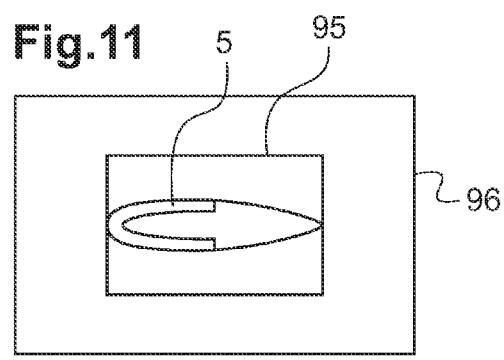

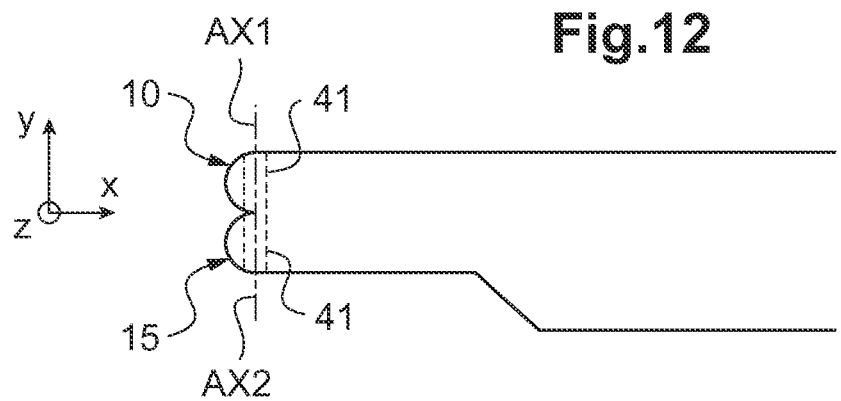
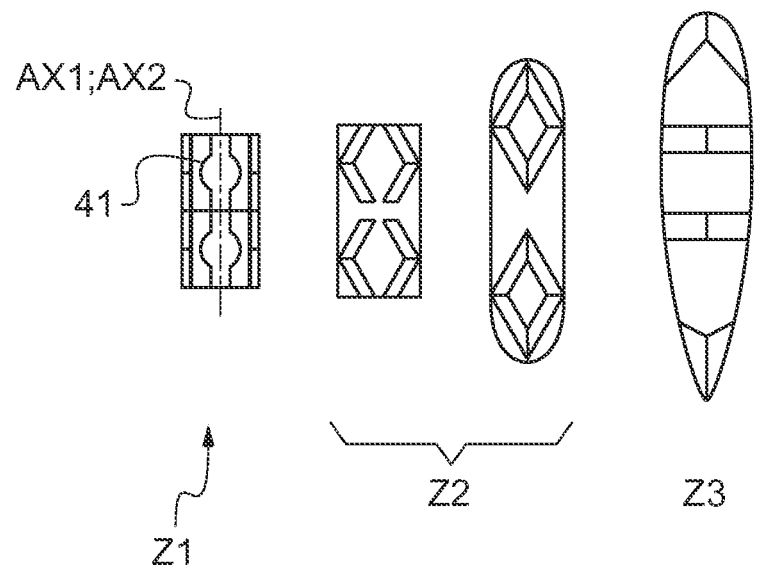

METHOD OF FABRICATING A SPAR FOR A BLADE, AND A METHOD OF FABRICATING A BLADE

CROSS REFERENCE TO RELATED APPLICATION

This application claims priority to French patent application No. FR 14 01624 filed on Jul. 18, 2014, the disclosure of which is incorporated in its entirety by reference herein.

BACKGROUND OF THE INVENTION (1) Field of the Invention

The present invention relates to a method of fabricating a spar for a blade, and to a method of fabricating the blade.

(2) Description of Related Art

A rotorcraft has at least one engine that drives a main rotor in rotation in order to provide the rotorcraft with lift and possibly also propulsion. The main rotor has a hub carrying a plurality of blades.

Blades conventionally comprise at least one spar extending spanwise from the root of the blade.

While they are rotating, the blades are subjected to a force torsor. The blades are subjected to centrifugal force and also to multiple forces and bending and twisting moments due to the movements of the blade, in particular due to its flapping movements and its lead-lag movements.

Consequently, a particular function of the spar is to transmit the forces to which the blade is subjected to the hub, and in particular to transmit centrifugal force.

A first type of blade has a spar arranged at the leading edge of the blade. The spar extends from the root of the blade along the span of the blade. That type of spar is referred to below for convenience as a "leading-edge" spar.

Such a leading-edge spar also contributes to static chord balancing of the blade.

Furthermore, the leading-edge spar tends to improve ability to withstand damage caused as a result of an object impacting against the leading edge.

A second type of blade has a spar referred to as a "distributed" spar. Such a distributed spar consists in a leading-edge spar that is extended in its running portion by two portions that are arranged flat respectively on the pressure side and on the suction side of the blade. In its running portion, a distributed spar thus has cross-sections of C-shape in a transverse plane that is substantially parallel to the axis of rotation of the rotor.

The distributed spar thus has a solid leading edge. This leading edge is extended by a top flap extending over the suction side of the blade and a bottom flap extending over the pressure side of the blade.

In addition to having the advantages of a leading-edge spar, a distributed spar tends to make the blade stiffer in flapping.

Furthermore, a distributed spar tends to optimize the strength of the blade by imparting advantageous strength to the blade in the event of local damage.

Nevertheless, it is difficult to fasten a blade having a distributed spar to a rotor hub.

In order to be fastened to a hub, the distributed spar of a blade may for example be wound at its root end around at least one vertical axis that is substantially parallel to the axis of rotation of the rotor. The blade is then fastened to the rotor by inserting a pin extending along such a vertical axis.

Nevertheless, fabricating such a distributed spar that is wound around at least one vertical pin can be difficult.

In a first step, an operator fabricates tape by impregnating resin into glass fiber roving arranged side by side and calendared to have the dimensions of the desired tape. The tape is assembled with a separator film and then wound on a reel or "roll".

Prior to being polymerized, the roving tape used for fabricating blades presents very good capacity for deformation. This deformation capacity enables an operator to obtain complex variations in shape by smoothing manually.

In a second step, the operator builds individual hanks from segments of a roving tape. Each hank then presents a plurality of layers of roving type.

Each individual hank is in the form of a long loop closely wound around a root wedge, the hank having sections that are substantially rectangular. Each hank has a C-shape in a plane that is substantially orthogonal to the axis of rotation of the rotor. Thus, each hank has two lateral strands connected to an end wall juxtaposed against the root wedge. Such a root wedge is an elongate part made of composite materials that is for receiving a fastener bushing.

In a third step, the operator drapes a skin over a first half-shell of a mold in order to embody the pressure side of the blade, and over a second half-shell of the mold in order to embody the suction side of the blade.

The hanks are then placed in the half-shells in order to be smoothed. The hank portion that is wound about the fastener bushing of the hanks are left practically untouched by the operator. In contrast, the two hanks of each strand are handled by the operator so as to be arranged in pre-established positions along the span of the blade.

Finally, the hanks are worked manually during a smoothing operation in order to cause the material to deform and to present predefined variations in section.

At identified reference positions along the blades, operators make use of templates that embody the sections to be given to the spar so as to ensure that the strands of the hanks are deformed progressively and as regularly as possible.

Performing the third step is found to be difficult.

The shapes of the spar are relatively simple at the fastener bushing and in the running portion of the blade. In simplified manner, the hanks extend substantially vertically in the vicinity of the fastener bushing and substantially horizontally at the pressure side and the suction side. In contrast, the path followed by each hank between those two end zones is complex. This path in particular is twisted in a complex zone referred to as the "connection" zone.

Furthermore, it is not easy to lay the hank fibers coming from the twisted section of the distributed spar so that they are flat on the suction side and the pressure side of the blade.

The twisting in the connection zone can then lead to shapes being poorly reproducible, and also to the mechanical and vibratory characteristics being poorly reproducible from one blade to another.

Furthermore, if filler elements need to be arranged in the blade, then the filler elements need to be complex in shape and to vary from one blade to another when the twisting of the spar is not reproduced identically. Blade fabrication can then be difficult to automate.

Document FR 2 918 347 proposes a fastener bushing enabling the distributed spar to be wound not around a vertical axis but rather around a horizontal axis.

Document JP S63-179706 describes a blade having two fastener bushings. The blade has a spar provided with a box including a rounded tip. The box is then extended by two arms each of which is wound around a fastener bushing.

Documents FR 2 321 997, FR 2 030 036, EP 1 035 963, and FR 993 491 are remote from the problems of the invention.

Documents DE 2 738 514 and GB 2 092 543 are also known.

Document FR 2 321 997 discloses a method of fabricating articles of non-circular section by winding continuous filaments.

That method makes use of a stationary mandrel that is inflatable. The mandrel is inflated in order to become circular in shape and is then set into rotation. Continuous filaments are then wound around the mandrel and coated in a curable resin.

The mandrel is then deflated to transform the winding into a deformable sheath.

The deformable sheath is then placed in the cavity of a mold. Thereafter an operator raises the pressure inside the sheath in order to cause the winding to fit closely to the shape of the mold. Finally, the operator causes the resin to cure in order to transform the sheath into a rigid hollow structure.

That method of winding continuous fibers around a stationary mandrel does not appear to be suitable for a distributed spar for a blade.

According to Document FR 2 030 036, an operator performs winding to make a cylindrical element that is to constitute the outer skin of the blade. The cylindrical element is then subdivided into two subassemblies, each of which is placed in a mold.

The spar of the blade is also made by winding.

The spar has a first block of fiber layers presenting an angle of 45° with the longitudinal axis of the blade, and then a second block of fiber layers presenting an angle of 30° with the longitudinal axis, and finally a third block of fiber layers presenting an angle of 15° with the longitudinal axis.

The spar projects to the outside at the blade root through an opening, and a wound attachment is wedged in the opening. Thereafter, the spar is inserted between the two molds in which the two subassemblies of the outer skin of the blade are arranged.

That fabrication method is effective but appears to be difficult to adapt to a distributed spar. Furthermore, multiple steps need to be performed.

Document EP 1 035 963 describes a control system for a fiber-placement device. That document EP 1 035 963 nevertheless does not give any teaching about a spar for a blade.

The fiber-placement method is an alternative to winding a continuous filament.

Fiber placement is a method of laying fibers, tapes, roving, or other similar reinforcement, while dry or when pre-impregnated with resin, on surfaces of various shapes. The placement is performed by using a device having a movable placement head. The placement head thus ensures that the material used is positioned on a surface by making direct mechanical contact with the surface. For this purpose, the placement head is moved by a movement system of the type comprising a robot or a positioning gantry, with degrees of freedom in movement that are servo-controlled depending on the shape of the surface to be covered.

The fiber-placement method thus makes it possible in particular to make surfaces of large dimensions and small thicknesses, within the limits set by the size of the placement head.

In particular, the fiber-placement method makes it possible automatically to perform operations of laying discontinuous fibers by performing starting, laying, and cutting operations.

Document FR 2 993 491 discloses a fiber-placement machine.

It should be observed that placing a roving tape by means of a placement system can be difficult. The material in the form of tapes as laid by placement systems tends to be viscous. That method then provides little latitude to an operator for smoothing the tape, and that can appear to be incompatible with making a spar.

Furthermore, the size of the volumes swept by a placement head would not appear to be compatible with the volumes of the half-shells used when fabricating a blade using the above-described method.

Finally, a spar presents large thicknesses, unlike the parts that are generally fabricated by fiber placement.

In addition, a spar presents sections in its span direction that are of a very great variety of kinds. Under such circumstances, fabricating a spar by applying a fiber-placement method would appear to be difficult to perform.

BRIEF SUMMARY OF THE INVENTION

An object of the invention is thus to provide a method of fabricating a spar for a blade by fabricating a distributed spar of a blade with the help of a composite material.

The invention thus provides a method of fabricating a spar of a blade using tapes of composite materials, said spar having at least one arrangement, each arrangement being for winding around a root axis, the method comprising the following steps:

during a preparation step, defining one male former per arrangement to be fabricated, each former having a pressure-side running surface, and a suction-side running surface of U-shape, each running surface comprising:
 a root zone provided with a C-shaped root wall forming an end wall of said U-shape;
 a connection zone presenting two twisted connection walls that are connected respectively to two ends of said end wall; and
 a running zone presenting two running walls connected respectively to the two connection walls;

during a fabrication step, subdividing each arrangement into a pressure-side subassembly and a suction-side subassembly, each comprising at least one hank, each hank comprising a plurality of U-shaped tape segments stacked on one another;

during said fabrication step, fabricating said pressure-side subassembly and said suction-side subassembly of an arrangement on a single former adapted to the arrangement and outside a mold for fabricating said blade, said pressure-side subassembly and said suction-side subassembly of an arrangement being fabricated by stacking tape segments on said former by a fiber placement method using a placement head, said placement head winding each tape segment of the pressure-side subassembly around a root axis by laying said segment over the pressure-side running surface, said placement head winding each tape segment of the suction-side subassembly around a root axis by laying said segment on the suction-side running surface; and during a heating step, heating each arrangement on its former.

Thus, if the tape segments include a thermosetting resin, then the spar is polymerized on being heated. If the tape segments include a thermoplastic resin, then the spar is consolidated on being heated.

The method thus proposes defining a former for each type of arrangement.

The former defines a pressure-side running surface and a suction-side running surface. Each arrangement is thus subdivided into a pressure-side subassembly for laying on a pressure-side running surface and a suction-side subassembly for laying on a suction-side surface.

Under such circumstances, the method proposes making a spar by laying U-shaped tape segments on a former so as to fabricate the various hanks such a tape may be a low-track tape provided with fibers that have been impregnated by the "solvent" technique.

The method thus defines the paths to be followed by a fiber placement head in order to obtain a spar presenting various sections. In particular, the method makes it possible to make a spar having a root axis referred to as "vertical" axis that is substantially orthogonal to the plane in which said spar extends spanwise. Such a root axis is then substantially parallel to the axis of rotation of the rotor fitted with the blade having the spar.

Under such circumstances, it becomes possible to lay tape segments by using a placement head mounted on the arm of a robot.

The arm may be moved in translation along a longitudinal bench extending parallel to a former. Furthermore, the head can also be tilted relative to the arm so as to be able to go round the root zone. The placement head thus presents six degrees of freedom, thereby enabling each tape segment to be laid along a U-shaped path.

The tape segments are thus laid in full and automatically on a former outside the mold for a blade, unlike certain present-day manual methods.

Consequently, the spars obtained by the method can be substantially identical to one another.

This method also presents the advantage of making it possible to fabricate a spar that is solid along its leading edge, i.e. a spar presenting considerable thickness. Nevertheless, the fiber placement method used to appear to be unsuitable for such fabrication.

As explained below, the former makes it possible to obtain hanks that are suitable for obtaining a solid leading edge.

Furthermore, the method makes it possible in particular to fabricate a distributed spar that is hollow in its running portion.

In addition, the method also makes it possible to make a spar that is wound around two optionally vertical pins, which used to appear to be incompatible with a path that can be followed by a placement head.

The method makes it possible to make a first arrangement on a first former and a second arrangement on a second former. The formers are then placed adjacent to each other prior to the step of heating the arrangements.

The tape segments are then laid in two passes, respectively on two different formers.

The method may also include one or more of the following characteristics.

Thus, the connection walls of a former together form a lozenge-shape ($\diamondsuit$) as seen in chord section of the former, thereby facilitating the laying of said segments.

This shape enables a placement head to lay the tape segments without risk of interfering with an auxiliary structure.

Furthermore, during said fabrication step, said placement head winds each tape segment of the pressure-side subassembly around a root axis by laying said segment over a first running wall of the pressure-side running surface, a first connection wall of the pressure-side running surface, the root wall, a second connection wall of the pressure-side running surface, and a second running wall of the pressure-side running surface, said placement head winding each tape segment of the suction-side subassembly around a first root axis by laying said segment over a first running wall of the suction-side running surface, a first connection wall of the suction-side running surface, the root wall, a second connection wall of the suction-side running surface, and a second running wall of the suction-side running surface.

The paths to be followed can thus be followed by a fiber placement head.

In addition, these paths make it possible in particular to obtain hanks that are provided with sections that are rectangular in the root zone. The hanks are then twisted in the connection zone and then spread out in the running zone.

The hank sections can be made to vary in spite of the material from which certain types of composite tape are made presenting very little ability to deform in creep.

The spreading is performed by a pre-programmed distribution of the directions in which the tapes are applied in the running zone. For example, the tape segments are offset transversely in the chord direction in alternation to the "left" and to the "right" relative to a middle direction, thereby making it possible to obtain the desired variations in section.

Furthermore, at least one former may be a removable former that is formed by using tooling representing an inside volume of a spar, said former being removed after said heating step.

The tape segments are then laid on a male former representative of the inside volumes that are surrounded by the spar.

Alternatively, at least one former is a non-removable former that is formed by a fastener bushing, a root wedge surrounding said fastener bushing, and a filler material of a blade.

The inside volume on which the tape segments are laid is then constituted by real individual parts that are to form portions of the blade. These individual parts may include, for example, a complete fastener bushing, a root wedge extending the bushing, and "lightweight" filler material that extends spanwise from the root wedge. Such a filler material may be a polyurethane type foam, for example.

Furthermore, the former may be arranged on tooling that is secured to a rocker, said rocker rocking the former during the fabrication step.

For example, the former may be fastened on a rocker by means of tooling. The tooling enables the former to be turned about its longitudinal axis of symmetry so as to be able to cover either its pressure-side running surface or else its suction-side running surface.

In addition, the rocker can rock during the operation of laying tape segments so as to facilitate movements of the placement head, in particular while turning around the root zone.

Advantageously, and in the context of a "vertical" type root axis, the rocking axis of the rocker passes through the vertical axis of the root zone and remains parallel with the longitudinal axis of symmetry of the former.

In another aspect, during the fabrication step, said hanks are formed one after another by laying all of the segments of one of the hanks on a former before laying the segments of another hank.

Furthermore, the sections of the hanks can be thought of as rectangles in the root zone. These sections can be made to vary so as to become tapering surfaces in order to match the stresses applied along the span.

In a first alternative, tapering may be performed by reducing the width of the tapes, as is made possible by subdividing the tape.

Thus, at least one tape segment of a subassembly covers, in the running zone, another segment of the subassembly over a chord width that decreases going away from said root axis.

In a second alternative, tapering may be performed in the span direction of the blade by cutting tape sections along a radius.

Thus, at least one tape segment of a subassembly extends spanwise from said root axis over a length referred to as a "first" length, and at least one other segment extends spanwise from said root axis over a length referred to as a "second" length that is different from the first length so as to impart decreasing thickness to the subassembly.

The first and second alternatives may be combined.

Furthermore, said spar includes an arrangement referred to as a "trailing-edge" arrangement, and a "trailing-edge" former is defined that is provided with a pressure-side running surface and with a suction-side running surface that are vertically spaced apart from each other.

In addition, said spar may have a "leading-edge" arrangement, and a "leading-edge" former is defined having a pressure-side running surface and a suction-side running surface that join together to form a tip.

After the tape segments have been laid, the leading-edge former and the trailing-edge former can be fastened together prior to heating said segments.

After the heating step, a single-piece spar is obtained provided with the leading-edge arrangement and with the trailing-edge arrangement.

Furthermore, the leading-edge former may, for example, present:

a suction-side running surface provided transversely with an outer suction-side zone and an inner suction-side zone that are spaced apart vertically by a suction-side step; and a pressure-side running surface that is provided transversely with an outer pressure-side zone and with an inner pressure-side zone that are spaced apart vertically by a pressure-side step, the inner pressure-side zone and the inner suction-side zone joining together to form said tip.

Such a leading-edge former makes it possible to obtain a spar that is solid at the leading edge of a blade. The leading-edge former enables hanks to be stacked so as to give the spar considerable thickness.

Thereafter, the laying of segments of a hank of the pressure-side subassembly may be alternated with the laying of segments of a hank of the suction-side subassembly, with a strand of one hank being placed adjacent against a strand of the previously-laid hank in the region of said tip in order to form a herring-bone configuration at the leading-edge.

The term "strand" is used to designate a segment of a hank.

More particularly, during the fabrication step, the following steps are performed:

forming a first hank of the suction-side subassembly by organizing a plurality of segments on said former using said placement head, each segment of the first hank comprising in succession a first strand with a central strand and a second strand, the first strand being laid on the outer suction-side zone and a suction-side connection zone, the central strand being laid on a suction-side root zone, and the second strand being laid on the suction-side connection zone and the inner suction-side zone, a suction-side portion of the outer suction-side zone leading to the suction-side step not being covered by the first strand, the second strand projecting transversely from the inner suction-side zone;

forming a second hank of the pressure-side subassembly by organizing a plurality of segments on said former using said placement head, each segment of the second hank comprising in succession a third strand with a central strand and a fourth strand, the third strand being laid on the outer pressure-side zone and on a pressure-side connection zone, the central strand being laid on a pressure-side root zone, the fourth strand being laid on the pressure-side connection zone and on the inner pressure-side zone, a pressure-side portion of the outer pressure-side zone leading to a pressure-side step not being covered by the first strand, the fourth strand projecting transversely from the inner pressure-side in order to press against an edge of the first strand;

forming a third hank of the suction-side subassembly by organizing a plurality of segments on said former using said placement head, each segment of the third hank comprising in succession a fifth strand with a central strand and a sixth strand, the fifth strand being laid jointly on said suction-side portion and partially on the second strand in the running portion and then covering the suction-side connection zone in the running portion, the central strand being laid on the suction-side root zone, and the sixth strand being laid on the suction-side connection zone and then in the running zone on the second strand and on an edge of the fourth strand, the sixth strand projecting transversely from the fourth strand; and forming a fourth hank of the pressure-side subassembly by organizing a plurality of segments on said former using said placement head, each segment of the fourth hank comprising in succession a seventh strand with a central strand and an eighth strand, the seventh strand being laid jointly on said pressure-side portion and in part on the fourth strand in the running portion and then covering the pressure-side connection zone in the running portion, the central strand being laid on the pressure-side root zone, and the eighth strand being laid on the pressure-side connection zone and then in the running zone on the fourth strand and against an edge of the sixth strand.

The method of the invention thus makes it possible to arrange hanks in a superposed herring-bone configuration at the leading-edge so as to enable this portion of the spar to be made "heavier" at will.

A small amount of manual shaping and smoothing may be envisaged prior to heating in order to improve the shape of the spar, locally flattening the rectangular sections of the strands so as to give them the desired final shape.

Optionally, the portion of the first hank that is laid on said inner suction-side zone is flush with the outer suction-side zone, and the portion of the second hank that is laid on said inner pressure-side zone is flush with the outer pressure-side zone.

Furthermore, the invention provides a method of fabricating a blade, the method comprising the following steps:

fabricating a spar by applying the method as described above;

fabricating a mold for the spar;

placing said spar in said mold; and placing said mold in heater means for heating said blade.

The invention also provides a blade having at least one fastener bushing and a spar, the spar including an arrangement wound around the fastener bushing, the arrangement comprising a pressure-side subassembly and a suction-side subassembly, the arrangement extending spanwise and comprising in succession a root zone in the region of the fastener bushing, a connection zone, and then a running zone.

At least one section referred to as "connection" section of said arrangement in the connection zone is lozenge-shaped (◇), said pressure-side subassembly being V-shaped and said suction-side subassembly having an upside-down V-shape in said connection section.

The term "upside-down" should be considered relative to an observer looking at the spar in the span direction, the suction-side subassembly being situated above the pressure-side subassembly.

This feature makes it possible to make the blade while using the above-described fiber-placement method.

The blade may then have a leading-edge arrangement and a trailing-edge arrangement. Each arrangement may possess a connection section that is lozenge-shaped. Nevertheless, it is possible for only one arrangement to have such a shape.

Furthermore, when said root axis is a vertical axis substantially orthogonal to a plane in which the spar extends spanwise, each section referred to as "root" section of said arrangement in the root zone may comprise at least one slab extending lengthwise in elevation.

Conversely, each "running" section of said arrangement in the running zone comprises at least one slab extending transversely lengthwise.

Each slab extends lengthwise and widthwise. The "length" of a slab of a spar thus represents the largest dimension of the slab.

In addition, at least one section of a leading-edge arrangement may present a C-shape in the running zone, with a trailing-edge arrangement extending the C-shape in the suction side and in the pressure side of the blade.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a plan view and section view showing a blade having a vertical root axis obtained by applying the method of the invention;

FIG. 2 is a diagrammatic view of a fiber placement system of the invention;

FIG. 3 is a view of a trailing-edge former carried by tooling;

FIG. 4 is a view of a leading-edge former;

FIG. 5 is a section view of a leading-edge arrangement;

FIG. 6 is a view of a leading-edge arrangement;

FIG. 7 is a diagrammatic view of a non-removable former;

FIG. 8 is a view showing a tape segment of decreasing width;

FIG. 9 is a view of two tape segments having different lengths;

FIG. 10 is a view showing tape segments that are offset in the chord direction;

FIG. 11 is a view showing how a blade is fabricated; and

FIG. 12 is a plan view and section view of a blade having a horizontal root axis obtained by applying the method of the invention.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y. The chord of the fabricated blade extends transversely, whereas the span of the blade extends longitudinally.

Finally, the third direction Z is said to be in elevation. The term "in elevation" relates to any direction parallel to the third direction Z.

FIG. 1 shows a blade 1 fabricated by applying the method of the invention.

The blade 1 has an outer skin 2 within which there extends a spar 5.

The spar 5 thus extends longitudinally along the span of the blade 1 in a plane P1 that extends spanwise and transversely along the chord of the blade 1.

Each section of the blade 1 is then a cross-section parallel to the second direction Y and to the third direction Z.

The spar 5 surrounds at least one fastener bushing. Thus, the spar 5 has one arrangement per fastener bushing. Each arrangement is then wound around a root axis AX1, AX2 of symmetry of a fastener bushing. In the embodiment of FIG. 1, such a root axis is a vertical axis substantially orthogonal to the plane P1 extending spanwise.

Nevertheless, and with reference to FIG. 12, the root axis could be a substantially horizontal axis lying in the plane P1 extending spanwise.

With reference to FIG. 1, the blade may have two fastener bushings 41. Under such circumstances, the spar 5 has one arrangement referred to as the "leading-edge" arrangement 10 that surrounds the fastener bushing closer to the leading edge of the blade and that is wound around a first root axis AX1. In addition, the spar 5 has another arrangement referred to as the "trailing-edge" arrangement 15 that surrounds the fastener bushing closer to the trailing edge of the blade, being wound around a second root axis AX2.

FIG. 1 also shows sections of the blade in a root zone Z1, a connection zone Z2, and a running zone Z3.

Each section of an arrangement is substantially in the form of two rectangles in the root zone Z1. The length of each rectangle extends substantially parallel to the corresponding root axis.

In contrast, each section of an arrangement is substantially lozenge-shaped (◇) in the connection zone Z2, this lozenge shape flattening on going away from the root zone.

Finally, each section of the leading-edge arrangement 10 tends to present a C-shape in the running zone Z3, the trailing-edge arrangement 15 extending this C-shape both in the suction side and in the pressure side of the blade in the embodiment of FIG. 1.

Such a spar 5 and such a blade 1 can be fabricated in automatic manner by applying the method of the invention.

The method seeks to fabricate the spar from at least one tape of composite materials by using a fiber placement head.

With reference to FIG. 2, the method uses a system having a robot 51. The robot 51 has an articulated arm 52 mounted on a carriage 54 that is slidable along rails 55. In addition, the robot 51 has a placement head 53 enabling segments of a tape made of composite materials to be laid on a support. Such a segment is referred to as a "tape segment" for convenience.

The placement head then has six degrees of freedom, namely three degrees of freedom to move in translation and three degrees of freedom to move in rotation.

Furthermore, the system may include one former 20, 30 per arrangement.

In order to fabricate a spar as shown in FIG. 1, the system then has a leading-edge former 20 for laying tape segments in order to embody the leading-edge arrangement 10. Furthermore, the system also has a trailing-edge former 30 serving to lay tape segments in order to embody the trailing-edge arrangement 15.

In order to lay tape segments made of composite materials on a former, the former may be organized on tooling 56. Such tooling may comprise pivot means 57 for causing the former to turn about its longitudinal axis of symmetry AX3. The longitudinal axis AX3 may cross the axis of the former embodying the root axis AX1 about which the arrangement in question is wound.

For example, the tooling comprises a plane plate 56' secured to two rods 56" suitable for carrying the former.

Furthermore, the tooling 56 may be carried by a rocker 60. The rocker 60 may comprise a shaft 58 secured to the tooling 56, and a servo-controlled motor 59 suitable for turning the shaft about an axis of rotation AX3. This axis of rotation AX4 is advantageously parallel to the longitudinal axis AX3 of the former being carried.

The rocker then serves to tilt the former relative to the placement head so as to facilitate laying tape segments.

The motor 59 and the robot 51 are controlled by a processor unit. The processor unit has a processor and memory, the processor executing instructions stored in the form of lines of code in the memory in order to apply the method of the invention. For example, the processor unit is a computer.

FIG. 3 shows a trailing-edge former 30 fastened to tooling 56. This FIG. 3 shows in particular tooling provided with a rod 56" carrying pivot means 57 and a rod 56''' carrying a pin 300 for fastening the arrangement that is to be made.

FIG. 4 shows a leading-edge former 20.

Thus, the blade fabrication method of the invention includes a method of fabricating a spar made of composite materials. The spar is provided with at least one fastener bushing. Under such circumstances, the spar has one subassembly known as an "arrangement" per fastener bushing.

In this method of fabricating a spar, one former 20, 30 is defined per arrangement that is to be fabricated during a preparation step STP1.

With reference to FIGS. 3 and 4, at least one former may be a removable former made with the help of tooling and representing an inside volume of a spar. Such a removable former is separated from an arrangement when the arrangement is heated.

Nevertheless, and with reference to FIG. 7, at least one former may be a non-removable former. The non-removable former then includes a fastener bushing 41, a root wedge 42 surrounding the fastener bushing, and filler material 43 representing component elements of the blade that is to be fabricated.

With reference to FIGS. 3 and 4, each former has a pressure-side running surface 21, 31 and a suction-side running surface 22, 32. Each running surface is U-shaped in horizontal section seen in an elevation direction Z.

Furthermore, each running surface has a root zone Z1 with a substantially vertical root wall 23, 33 that is C-shaped, in order to make the spar of FIG. 1. This root wall thus forms a U-shaped end wall 231, 331 of the running surface.

In addition, each running surface has a connection zone Z2 presenting two connection walls 24, 25 or 34, 35 that are offset transversely, twisted, and respectively connected to two ends 232, 233, or 332, 333 of the end wall 231, 331 of the running surface.

The two connection walls of the suction-side connection surface of a former and the two connection walls of the pressure-side connection surface of the former together generate a lozenge-shape as seen in cross-section of the former.

Finally, each running surface has a running zone Z3 presenting two running walls 26, 27 or 36, 37 that are offset transversely and connected respectively to the two connection walls 24, 25 or 34, 35.

In summary, each former has a suction-side running surface of U-shape that comprises in succession a running wall referred to as a "first suction-side running wall" 26, 36, a connection wall referred to as a "first suction-side connection wall" 34, 24, a root wall 23, 33, a connection wall referred to as a "second suction-side connection wall" 25, 35, and a running wall referred to as a "second suction-side running wall" 27, 37.

The first suction-side running wall 26, 36 forms an outer suction-side zone 224. The second suction-side running wall 25, 35 forms an inner suction-side zone 223.

Under such circumstances, the first suction-side connection wall 24, 34 and the second suction-side connection wall 27, 37 together form a suction-side connection zone.

Likewise, each former has a pressure-side running surface that is U-shaped, comprising in succession a running wall referred to as a "first pressure-side running wall", a connection wall referred to as a "first pressure-side connection wall", a root wall, a connection wall referred to as a "second pressure-side connection wall", and a running wall referred to as a "second pressure-side running wall".

The first pressure running wall forms an outer pressure-side zone 222. The second pressure-side running wall forms an inner pressure-side zone 225.

The first pressure-side connection wall and the second pressure-side connection wall together form a pressure-side connection zone.

Furthermore, and with reference to FIG. 3, the trailing-edge former may include a pressure-side running surface 31 and a suction-side running surface 32 that are vertically spaced apart from each other.

In contrast, and with reference to FIG. 4, the leading-edge former 20 is provided with a pressure-side running surface 21 and a suction-side running surface 22 that meets so as to form a tip.

In addition, the outer suction-side zone 224 and the inner suction-side zone 223 of the leading-edge former 20 are vertically and transversely spaced apart by a suction-side step 226. Similarly, the outer pressure-side zone 222 and the inner pressure-side zone 221 are spaced apart vertically and transversely by a pressure-side step 225.

Finally, the inner pressure-side zone 221 and the inner suction-side zone 223 join together to form the tip of the leading-edge former.

Under such circumstances, and with reference to FIG. 3, a placement head can lay a U-shaped tape segment on the running surface that does not face the plate 56' of the tooling. In order to lay tape segments on the other running surface, it suffices to pivot the former by using the pivot means 57, after previously removing the pin 300.

During a fabrication step STP2, each arrangement is subdivided into a pressure-side subassembly and a suction-side subassembly.

Each subassembly then has at least one hank, each hank being constituted by a stack of tape segments forming a U-shape that are laid on a running surface of a former.

Each arrangement of the spar is then fabricated separately and outside a mold for the blade.

The appropriate former is thus placed on the tooling. A subassembly of the arrangement is then fabricated with the help of the placement head, possibly while using the rocker.

The former is then turned over. The other subassembly of the arrangement is then fabricated with the help of the placement head, possibly while using the rocker.

Each subassembly is fabricated by stacking tape segments on the former by means of a fiber placement method.

For example, the placement head 53 then winds each tape segment of the pressure-side subassembly around a root axis AX1, AX2 of the former while laying said segment on the pressure-side running surface 21, 31. The placement head optionally winds each tape segment of the pressure-side subassembly around a root axis by following a U-shaped path. The placement head then lays a segment over a first running wall of the pressure-side running surface, a first connection wall of the pressure-side running surface, the root wall, a second connection wall of the pressure-side running surface, and a second running wall of the pressure-side running surface.

Thereafter, the placement head 53 winds each tape segment of the suction-side subassembly around a root axis AX1, AX2, laying said segment on the suction-side running surface. For example, the placement head winds each tape segment of the suction-side subassembly around a root axis by laying said segment over a first running wall of the suction-side running surface, a first connection wall of the suction-side running surface, the root wall, a second connection wall of the suction-side running surface, and a second running wall of the suction-side running surface.

The hanks are optionally fabricated one after the other by applying all of the segments of one hank on a former prior to placing the segments of another hank.

In addition, the spar may have thickness that tapers spanwise going away from a root axis.

In order to obtain this characteristic, and with reference to FIG. 8, at least one tape segment 72 of a subassembly may cover in the running zone another segment 71 of the subassembly across a decreasing chord width 73.

In the variant of FIG. 9, at least one tape segment 74 of a subassembly extends spanwise from a root axis over a first length L1. Under such circumstances, at least one other segment 75 extends spanwise from the root axis over a second length L2 that is different from the first length L1, and in particular that is shorter than the first length L1.

In the variant of FIG. 10, at least one segment 76 is offset transversely relative to another segment 77 in the running zone.

These variants can be combined.

With reference to FIG. 5, the leading-edge arrangement may be made by alternating the laying of segments of a hank of the pressure-side subassembly with laying segments of a hank of the suction-side subassembly. Furthermore, the placement head acts in the vicinity of the tip 28 of the leading-edge former to lay a strand 82 of a hank against a previously-laid strand of the hank so as to form a leading-edge herring-bone configuration 84.

This characteristic makes it possible to obtain a solid leading edge.

For example, the placement head forms a first hank 91 of the suction-side subassembly of the leading-edge arrangement.

This placement head thus organizes a plurality of tape segments on the leading-edge former 20. It should be observed that only the segments of the first hank are shown in order to avoid overcrowding FIG. 5.

Each segment of the first hank 91 may have a first strand 81, a central strand 81$b$ that can be seen in FIG. 6, and a second stand 82 so as to impart a U-shape to the segment. Thereafter, the placement head lays the first strand 81 on the outer suction-side zone 224 and the suction-side connection zone, the central strand 81$b$ on a suction-side root zone, and the second strand 82 on the suction-side connection zone and the inner suction-side zone 223.

A suction-side portion 227 of the outer suction-side zone 224 leading to the suction-side step 226 is nevertheless not covered by the first strand 81.

However, the second strand 82 projects transversely from the inner suction-side zone 223.

Advantageously, the portion 821 of the first hank 91 that is laid on the inner suction-side zone 223 is flush with the outer suction-side zone 224.

Thereafter, the placement head forms a second hank 92 of the pressure-side subassembly 11 with each segment of the second hank comprising in succession a third strand 83 together with a central strand 83$b$ that can be seen in FIG. 6, and a fourth strand 84.

For each segment, the placement head lays the third strand 83 on the outer pressure-side zone 222 and a pressure-side connection zone, the central strand 83$b$ on a pressure-side root zone, and the fourth strand 84 on the pressure-side connection zone and on the inner pressure-side zone 221.

Nevertheless, a pressure-side portion 228 of the outer pressure-side zone 222 leading to the pressure-side step 225 is not covered by the third strand 83.

However, the fourth strand 84 projects transversely from the inner pressure-side zone 221 so as to press against an edge of the first strand 81.

The portion 841 of the second hank 92 that is laid on said inner pressure-side zone 221 is flush with the outer pressure-side zone 222.

The placement head then forms a third hank 93 of the suction-side subassembly by organizing a plurality of segments on said former, each segment of the third hank comprising in succession a fifth strand 85 together with a central strand 85$b$ visible in FIG. 6, and a sixth strand 86.

For each segment, the placement head lays the fifth strand 85 jointly on the suction-side portion 227 and partially on the second strand 82 in the running portion and then on the suction-side connection zone. The central strand 85$b$ is laid on the suction-side root zone. In addition, the sixth strand 86 is laid on the suction-side connection zone and then in the running zone on the second strand 82 and on an edge of the fourth strand 84.

In addition, the sixth strand 86 projects transversely from the fourth strand 84.

Finally, the placement head forms a fourth hank 94 of the pressure-side subassembly by organizing a plurality of segments on said former. Each segment of the fourth hank 94 comprises in succession a seventh strand 87 together with a central strand 87$b$ visible in FIG. 6, and an eighth strand 88.

For each strand, the placement head lays the seventh strand 87 jointly on said pressure-side portion 228 and in part on the fourth strand 84 in the running portion and then on the pressure-side connection zone. The central strand is laid on the pressure-side root zone. Finally, the eighth strand 88 is laid on the pressure-side connection zone and then in the running zone on the fourth strand 84 and against an edge of the sixth strand 86.

FIG. 6 is a diagram showing the resulting leading-edge arrangement.

Furthermore, when the placement head has laid all of the tape segments on a former, the arrangement is heated on the former.

For a spar having two fastener bushings, the leading-edge former and the trailing-edge former may be placed adjacent each other and then heated together in order to polymerize or consolidate the spar.

With reference to FIG. 11, an operator also fabricates a mold 95 of the blade that is to be fabricated. The operator then places the spar 5 in the mold 95.

The mold 95 is then placed in heater means in order to polymerize or consolidate the blade 1.

Naturally, the present invention may be subjected to numerous variations as to its implementation. Although several implementations are described, it will readily be understood that it is not conceivable to identify exhaustively all possible implementations. It is known to be possible to envisage replacing any of the means described by equivalent means without going beyond the ambit of the present invention.

What is claimed is:

1. A method of fabricating a spar of a blade from tapes made of composite materials, the spar including transversely at least one arrangement, each arrangement being for winding around a root axis of the spar, the method comprising the following steps:
    during a preparation step, defining one male former per arrangement to be fabricated, each former having a pressure-side running surface, and a suction-side running surface of U-shape, each running surface comprising:
        a root zone provided with a C-shaped root wall forming an end wall of the U-shape suction-side running surface;
        a connection zone presenting two twisted connection walls that are connected respectively to two ends of the end wall; and
        a running zone presenting two running walls connected respectively to the two connection walls;
    during a fabrication step, subdividing each arrangement into a pressure-side subassembly and a suction-side subassembly, each comprising at least one hank, each hank comprising a plurality of U-shaped tape segments stacked on one another;
    during the fabrication step, fabricating the pressure-side subassembly and the suction-side subassembly of an arrangement on a single former adapted to the arrangement and outside a mold for fabricating the blade, the pressure-side subassembly and the suction-side subassembly of an arrangement being fabricated by stacking tape segments on the former by a fiber placement method using a placement head, the placement head winding each tape segment of the pressure-side subassembly around a root axis by laying the segment over the pressure-side running surface, the placement head winding each tape segment of the suction-side subassembly around a root axis by laying the segment on the suction-side running surface; and
    during a heating step, heating each arrangement on its former.

2. The method according to claim 1, wherein at least one former is a removable former formed using tooling representing an inside volume of a spar, the former being removed after the heating step.

3. The method according to claim 1, wherein at least one former is a non-removable former formed by a fastener bushing, a root wedge surrounding the fastener bushing, and a filler material of a blade.

4. The method according to claim 1, wherein the former is arranged on tooling that is secured to a rocker, the rocker rocking the former during the fabrication step.

5. The method according to claim 1, wherein during the fabrication step, the hanks are formed one after another by laying all of the segments of one of the hanks on a former before laying the segments of another hank.

6. The method according to claim 1, wherein at least one tape segment of a subassembly covers, in the running zone, another segment of the subassembly over a chord width that decreases.

7. The method according to claim 1, wherein at least one tape segment of a subassembly extends spanwise from the root axis over a length referred to as a "first" length, and at least one other segment extends spanwise from the root axis over a length referred to as a "second" length that is different from the first length so as to impart decreasing thickness to the subassembly.

8. The method according to claim 1, wherein the spar includes an arrangement referred to as a "trailing-edge" arrangement, and a "trailing-edge" former is defined that is provided with a pressure-side running surface and with a suction-side running surface that are vertically spaced apart from each other.

9. The method according to claim 1, wherein the spar has a "leading-edge" arrangement and a "leading-edge" former is defined having a pressure-side running surface and a suction-side running surface that join together to form a tip.

10. The method according to claim 9, wherein the leading-edge former presents:
    a suction-side running surface provided transversely with an outer suction-side zone and an inner suction-side zone that are spaced apart vertically by a suction-side step; and
    a pressure-side running surface that is provided transversely with an outer pressure-side zone and with an inner pressure-side zone that are spaced apart vertically by a pressure-side step, the inner pressure-side zone and the inner suction-side zone joining together to form the tip.

11. The method according to claim 10, wherein the laying of segments of a hank of the pressure-side subassembly is alternated with the laying of segments of a hank of the suction-side subassembly with a strand of one hank being placed adjacent against a strand of the previously-laid hank in the region of the tip in order to form a herring-bone configuration at the leading-edge.

12. The method according to claim 10, wherein during the fabrication step the following steps are performed:
    forming a first hank of the suction-side subassembly by organizing a plurality of segments on the former using the placement head, each segment of the first hank comprising in succession a first strand with a central strand and a second strand, the first strand being laid on the outer suction-side zone and a suction-side connection zone, the central strand being laid on a suction-side root zone, and the second strand being laid on the suction-side connection zone and the inner suction-side zone, a suction-side portion of the outer suction-side zone leading to the suction-side step not being covered by the first strand, the second strand projecting transversely from the inner suction-side zone;

forming a second hank of the pressure-side subassembly by organizing a plurality of segments on the former using the placement head, each segment of the second hank comprising in succession a third strand with a central strand and a fourth strand, the third strand being laid on the outer pressure-side zone and on a pressure-side connection zone, the central strand being laid on a pressure-side root zone, the fourth strand being laid on the pressure-side connection zone and on the inner pressure-side zone, a pressure-side portion of the outer pressure-side zone leading to a pressure-side step not being covered by the first strand, the fourth strand projecting transversely from the inner pressure-side in order to press against an edge of the first strand;

forming a third hank of the suction-side subassembly by organizing a plurality of segments on the former using the placement head, each segment of the third hank comprising in succession a fifth strand with a central strand and a sixth strand, the fifth strand being laid jointly on the suction-side portion and partially on the second strand in the running portion and then covering the suction-side connection zone in the running portion, the central strand being laid on the suction-side root zone, and the sixth strand being laid on the suction-side connection zone and then in the running zone on the second strand and on an edge of the fourth strand, the sixth strand projecting transversely from the fourth strand; and forming a fourth hank of the pressure-side subassembly by organizing a plurality of segments on the former using the placement head, each segment of the fourth hank comprising in succession a seventh strand with a central strand and an eighth strand, the seventh strand being laid jointly on the pressure-side portion and in part on the fourth strand in the running portion and then covering the pressure-side connection zone in the running portion, the central strand being laid on the pressure-side root zone, and the eighth strand being laid on the pressure-side connection zone and then in the running zone on the fourth strand and against an edge of the sixth strand.

13. The method according to claim 12, wherein the portion of the first hank that is laid on the inner suction-side zone is flush with the outer suction-side zone, and the portion of the second hank that is laid on the inner pressure-side zone is flush with the outer pressure-side zone.

14. The method according to claim 1, wherein during the fabrication step, the placement head winds each tape segment of the pressure-side subassembly around a root axis by laying the segment over a first running wall of the pressure-side running surface, a first connection wall of the pressure-side running surface, the root wall, a second connection wall of the pressure-side running surface, and a second running wall of the pressure-side running surface, the placement head winding each tape segment of the suction-side subassembly around a first root axis by laying the segment over a first running wall of the suction-side running surface, a first connection wall of the suction-side running surface, the root wall, a second connection wall of the suction-side running surface, and a second running wall of the suction-side running surface.

15. A method of fabricating a blade, the method comprising the following steps:
fabricating a spar by applying the method according to claim 1;
fabricating a mold for the spar;
placing the spar in the mold; and
placing the mold in heater means for heating the blade.

16. The method of claim 1, wherein the spar includes an arrangement wound around a fastener bushing, the arrangement comprising a pressure-side subassembly and a suction-side subassembly, the arrangement extending spanwise and comprising in succession a root zone in the region of the fastener bushing, a connection zone, and then a running zone, wherein at least one section referred to as "connection" section of the arrangement in the connection zone is lozenge-shaped, the pressure-side subassembly being V-shaped and the suction-side subassembly having an upside-down V-shape in the connection section.

17. The method according to claim 1, wherein each section referred to as "root" section of the arrangement in the root zone comprises at least one rectangular slab extending in elevation along its length, the root axis being a vertical axis substantially orthogonal to the plane in which the spar extends spanwise.

18. The method according to claim 1, wherein at least one section of a leading-edge arrangement presents a C-shape in the running zone, with a trailing-edge arrangement extending the C-shape in a suction side and in a pressure side of the blade.

* * * * *